Feb. 2, 1965    N. S. ABDALIAN ETAL    3,168,469
DRY CLEANING SOLVENT PURIFYING APPARATUS
Filed Jan. 17, 1961    3 Sheets-Sheet 1
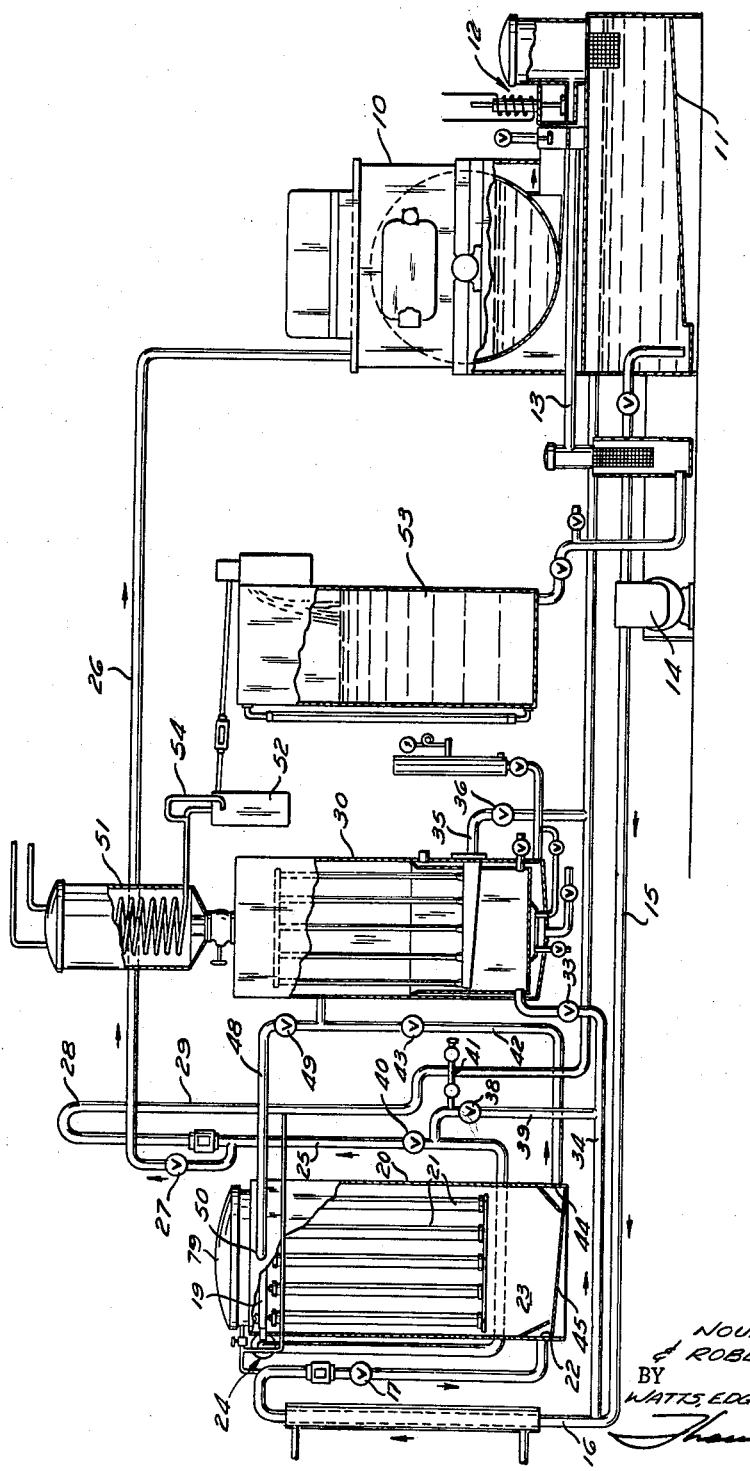
Fig. 1
INVENTORS
NOUBAR S. ABDALIAN,
& ROBERT V. ABDALIAN,
BY
WATTS, EDGERTON, PYLE & FISHER
ATTORNEYS

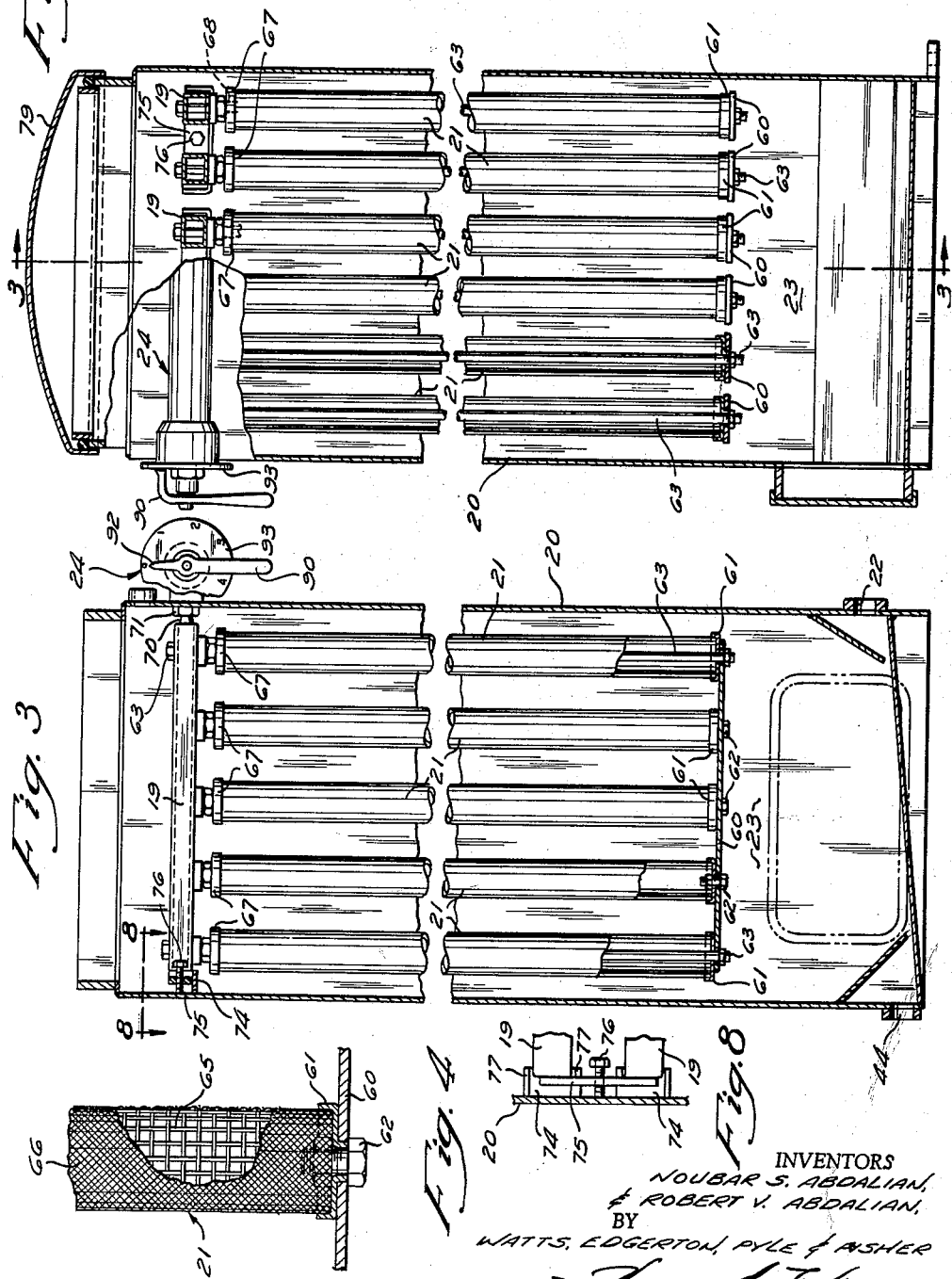

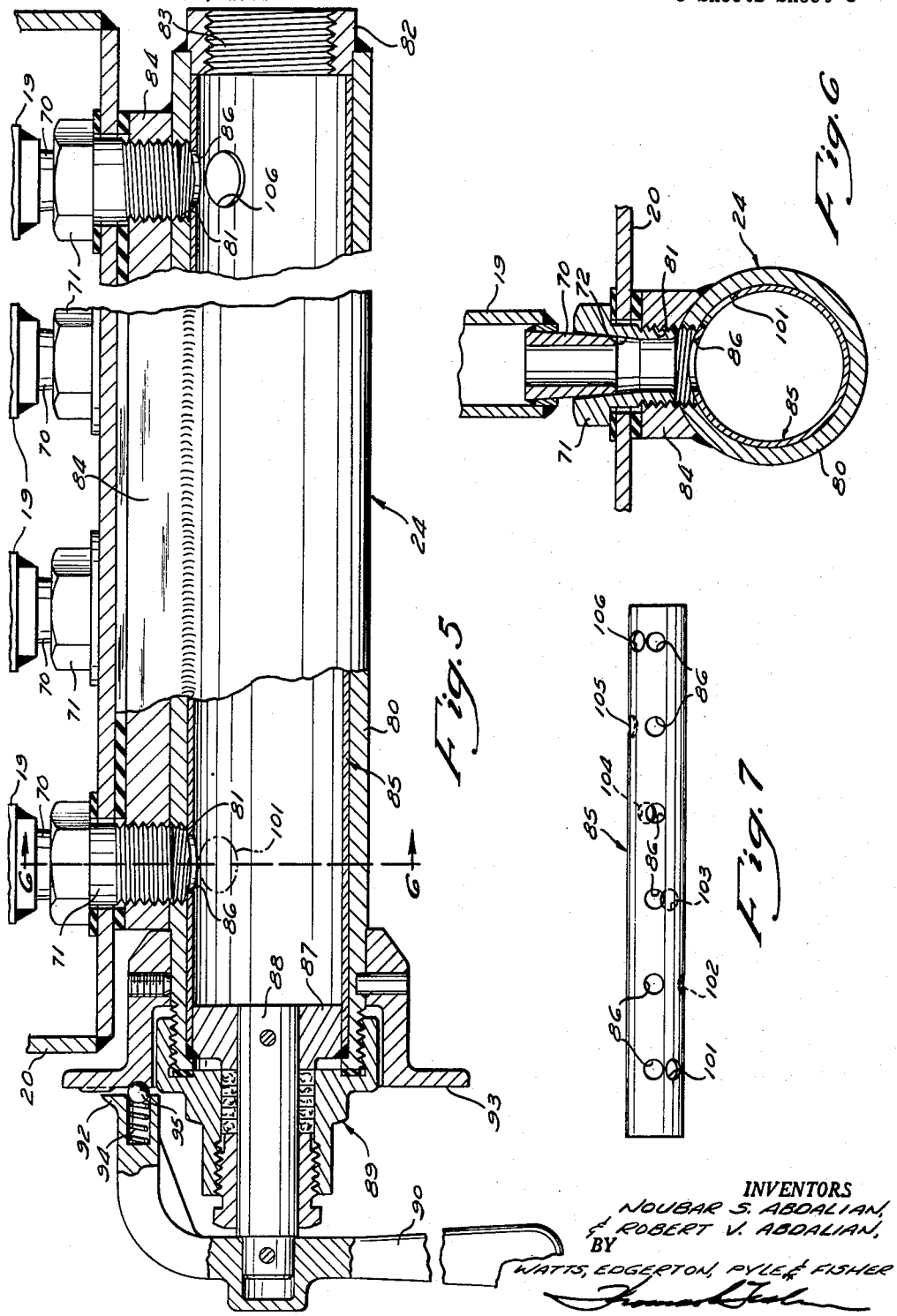

United States Patent Office 3,168,469
Patented Feb. 2, 1965

3,168,469
DRY CLEANING SOLVENT PURIFYING
APPARATUS
Noubar S. Abdalian, 3767 Freemont Road, South Euclid, Ohio, and Robert V. Abdalian, 3159 Berkshire Road, Cleveland Heights, Ohio
Filed Jan. 17, 1961, Ser. No. 83,200
3 Claims. (Cl. 210—232)

This invention relates to dry cleaning systems and more particularly to a lint filtering apparatus in such a system.

The elements of the usual dry cleaning system are set forth in greater detail in copending application for Letters Patent entitled "Dry Cleaning Apparatus," Serial No. 5,426, filed January 29, 1960, now U.S. Patent No. 3,097,164, granted July 9, 1963, by Sebough S. Shields. These elements include a cleaning chamber, a pump, a supply tank, and a solvent purifier. In addition to the usual connections between the listed elements, the elements are normally connected to a main filter assembly for removing impurities from a circulating solvent. This main filter is more commonly known as a lint filter.

This invention is directed to a novel and improved filter assembly and filter elements for filtering suspended particles from a circulating solvent. Particles removed from the solvent by the elements tend to clog the filter elements and impede the flow of the solvent after the filter elements have been in use for a time. It then becomes necessary to "back flush" the elements from time to time and eventually to either remove and replace the elements with new elements, or to remove, clean, and reposition the same elements. For this reason, both facile removal and replacement and an ability to back flush efficiently are highly desirable. The present invention is outstanding in all of these.

The facile removal and replacement must be accompanied by a relatively tight seal with an associated manifold to assure that substantially all of the fluid passes through the filter elements into the manifold and does not leak around the sides to allow unfiltered solvent to enter the dry cleaning system beyond the filtering tank.

With the lint filter assembly of this invention a filter tank is provided. Inlet, outlet, and reverse flushing conduits are all connected to the tank. A plurality of elongated tube type filter elements are disposed within the tank. These filter elements are arranged in groups with the elements of each group being connected together to form a bank. One end of each element is closed and the other end is connected to a bank manifold. The bank manifold includes an outlet that is removably connected to a main manifold. The main manifold in turn is connected to the solvent outlet conduit. A clamping means is provided to maintain the bank manifolds in fluid tight connection with the main manifold. This construction, then, has the outstanding advantage that an entire bank of filters may be removed as a unit for repair, replacement, or cleaning by simply releasing the clamping means and then lifting the entire bank out of the filter tank.

Another of the outstanding advantages of the assembly of this invention is that the outlet manifold also serves as a back flushing valve. The outlet manifold is preferably a cylindrical tube with a rotatable sleeve disposed within it. The sleeve has holes formed in it and arranged in a pattern such that a hole may be lined with each of the bank manifolds to open them all simultaneously for filtering and for back flushing all at one time. The sleeve also has circumferentially and axially staggered holes. These staggered holes are positioned such that when the sleeve is rotated, the bank manifolds are brought into fluid communication with the main manifold sequentially one at a time. With this arrangement, the entire force of back flushing fluid, entering the main manifold through the conduit which is normally the outlet, may be directed through a single bank of filters.

Therefore, one of the principal objects of this invention is to provide a filter assembly having facilely removable and replaceable filter elements.

Another object of the invention is to provide a novel and improved filter assembly capable of having improved back flushing.

A more particular object of this invention is to provide bank manifold with a group of filter elements connected to it to provide a bank which is easily replaced and has a highly efficient seal to insure nonleakage.

A further object of this invention is to provide a plurality of banks of filter elements, each of which banks can be removed and replaced facilely and simply.

Another object of the invention is to provide a filter assembly in which the banks of filter elements can be back flushed simultaneously or sequentially one bank at a time.

A related object of the invention is to provide a novel and improved back flushing valve for a filter assembly.

Still another object of the invention is to provide a novel and improved filter assembly in which the outlets are at the top of the assembly.

A more particular object of the invention is to provide a novel and improved filter element for a dry cleaning filter assembly.

Other objects and a fuller undestanding of the invention may be had by referring to the following description and claims taken in conjunction with the accompanying drawings, in which:

FIGURE 1 is a schematic plan view with parts broken away and removed of a dry cleaning system incorporating the novel and improved filter assembly;

FIGURE 2 is a sectional view of the novel and improved filter assembly on an enlarged scale with respect to FIGURE 1;

FIGURE 3 is an end elevational view of the control valve and a sectional view of the remainder of the assembly as seen from the plane indicated by line 3—3 of FIGURE 2;

FIGURE 4 is a fragmentary elevational view with parts broken away and removed of a portion of one filter element connected to a strap and on an enlarged scale with respect to FIGURES 2 and 3;

FIGURE 5 is a foreshortened top plan view of the new valve-manifold on an enlarged scale with respect to the other figures and with parts broken away and removed;

FIGURE 6 is a sectional view of the valve-manifold as seen from the plane indicated by the line 6—6 of FIGURE 5;

FIGURE 7 is a enlarged plan view of the valve sleeve on a reduced scale with respect to FIGURES 5 and 6 and enlarged with respect to FIGURES 2 and 3; and, FIGURE 8 is a fragmentary sectional view as seen from the plane indicated by the line 8—8 of FIGURE 3.

The detailed operation of a dry cleaning system is explained in the United States Patent No. 2,729,861, issued January 10, 1956, entitled "Dry Cleaning Apparatus," and the above-referenced patent application. The present invention utilizes elements and methods of operation quite similar to the structure disclosed and taught in that patent. The features which are environmental to the present invention and shown in detail in that patent will only be described briefly here.

In FIGURE 1, a dry cleaning compartment 10 is shown. The compartment 10 is connected to solvent storage tank 11 by a valve and pipe system designated generally at 12.

This valve and pipe system 12 selectively directs solvent discharge from the compartment 10 either into the storage tank 11 or into a bypass pipe 13. A circulating pump 14 is provided which selectively pumps solvent from the storage tank 11, from the bypass pipe 13, or from both, through the system.

During normal operation, the circulating pump 14 constantly pumps solvent into a delivery pipe 15. The solvent passes from the delivery pipe 15 through a main filter assembly supply pipe 16 when a connected control valve 17 is open. The main filter supply pipe 16 is connected to a tank 20 of the main filter assembly. It is in this filter assembly that the invention resides.

The main filter supply pipe 16 communicates with the main filter tank 20 through an inlet opening 22. The inlet opening 22 is near the bottom of the main filter tank 20 and opens into a solvent chamber 23 formed internally of the tank 20.

Solvent passes from the chamber 23 through perforate walls of a plurality of filter elements 21 and then into bank manifolds 19. The fluid passes from the bank manifolds 19 into a main valve-manifold shown generally at 24. The valve-manifold 24 is connected to an outlet conduit 25. The details of the construction of the filter elements 21 and the manifolds 19, 24, will be explained in greater detail below.

The outlet conduit 25 delivers filtered solvent from the tank 20. The filtered solvent may pass through a cleaning compartment delivery conduit 26 into the cleaning compartment 10. A valve 27 controls the flow of filtered solvent through the delivery conduit 26. When the valve 27 is closed, the filtered solvent passes through a gravitational valve 28 and thence through a return conduit 29 back to the storage tank 11.

A solvent purifier in the form of a specialized filtering still 30 is provided. This specialized still 30 is known in the dry cleaning industry as a "muck cooker." The structure and operation of the preferred muck cooker are more fully described in copending application for patent Serial No. 73,608, filed December 5, 1960, under the title "Dry Cleaning Solvent Purifying Apparatus."

Periodically, all the solvent in the system may be pumped through the muck cooker for a purifying process. To accomplish this a muck cooker supply valve 33 is opened and solvent is then pumped from the storage tank 11 through the supply conduit 15 and a muck cooker supply conduit 34 into the muck cooker. The purified solvent is returned to the storage tank 11 by a muck cooker return conduit 35 which is controlled by a muck cooker return conduit valve 36. The muck cooker return conduit 35 is connected to the return conduit 29.

Periodically, it is desirable to clean the filters 21 and the filter tank by this reverse flushing process. This is accomplished by closing the solvent filter tank inlet control valve 17 and opening a reverse flushing inlet control valve 38. Solvent is then conducted through the muck cooker supply conduit 34 and thence through a reverse flushing conduit 39 into the manifolds 19, 24. A filtered solvent outlet control valve 40 is also closed to close the filter tank outlet conduit 25 and cause the reversely directed solvent to bow into the manifold 19 rather than the conduit 25.

When the solvent is pumped through the reverse flushing conduit 39 into the manifold 19, it passes in a reverse direction through the filters 21, flushing lint particles, filter powder encrusted on the filters, and other filtered-out objects off the filters 21. Air may be introduced through an air conduit 41 to assist in loosening this encrusted powder and other filtered-out objects from the filters 21. A reverse flushing outlet conduit 42 is opened by opening the reverse flushing conduit control valve 43. The reverse flushing conduit 42 conducts solvent and suspended powder from a solvent filter tank flushing outlet passage at 44 into the muck cooker 30. A slanted baffle 45 helps the flowing solvent carry the filter powder, filtered lint sediment, and the like, out through the reverse flushing outlet opening 44, which, as will be seen by examining the drawing, is at the bottom of the solvent filter tank 20.

The solvent passes through the filters in the muck cooker and then back to the supply tank. Subsequently, steam is passed up through the sediment, or muck, in the cooker to carry solvents into a condenser chamber 51. The condenser vapors are conducted to a water separator 52. Solvent then passes from the water separator 52 to reserve tank 53 while water is discharged from the tube 54.

As is described in greater detail in the first referenced copending applicant, the light contaminant outlet conduit 48 connects the top of the chamber 23 with the muck cooker 30. The connection of the light contaminant outlet to the tank 20 is identified by the numeral 50. This connection is near the top of the tank and slightly below the normal fluid level of the tank to permit water and other light-weight contaminants to be tapped off. The outlet contaminant conduit 48 is controlled by a valve 49. Impurities may be directed from the top of the chamber 23 to the muck cooker 30, at any time when the pump 14 is operating by opening the valve 49.

The preceding discussion will provide a general description of the dry cleaning filter apparatus shown in FIGURE 1, including the main filter assembly. The details of construction of the main filter assembly are shown with greatest clarity in FIGURES 2–8 and the remainder of the description here will be directed to those features.

As is best seen in FIGURE 3, the filter elements 21 are arranged in banks. In the embodiment shown there are five elements 21 in each bank. The five elements of each bank are secured to one of the bank manifolds 19 to provide a sub-assembly which will be referred to as a bank. Each bank has a lower supporting strap 60. Lower element closing end caps 61 are also secured to the strap 60. The central lower end cap 61 and the adjacent caps are each secured by short bolts 62. The bank is held together by a spaced pair of long end bolts 63 which extend from the lower strap through the other two or end caps 61, the end filter elements 21 and through the bank manifold 19.

One of the outstanding features of the invention resides in the construction of the filter elements which permits a unit to be maintained together in this described manner. The filter elements themselves have the inherent strength and rigidity to maintain the bank manifold 19 and the lower strap 60 in spaced relationship. Further, the space within the filters is completely open and unobstructed with the very nominal exception of the elongated end bolts 63 which maintain the bank as a unit.

The filter elements 21 are each comprised of an inner rigid tube of reinforcing mesh 65, FIGURE 4, which is preferably made of ⅜ inch square mesh of 0.062 inch galvanized wire. The mesh tube 65 is surrounded by a tube 66 of 50–54–011 Monel screen. This, in realty, is the filter element. The mesh and screen tubes 65, 66 telescope into the lower end cap 61. A top cover or cap 67 comparable to the lower cap 61, telescopes over the top of the mesh and screen tubes 65, 66 of each element. Each of the upper caps 67 is apertured at 68, FIGURE 2, to provide fluid communication between each filter element and inlets in its connected bank manifold 19.

Each bank manifold 19 is an elongated, preferably square, tube. A tapered nipple 70, FIGURE 6, provides a fluid outlet from the bank manifold to communicate with the valve-manifold 24. The valve-manifold 24 is secured to the tank 20 by fittings 71 which project through a side wall of the tank 20 and thread into the valve-manifold 24. The fittings 71 each have a through passage defined in part by a frusto-conical shaped surface 72. Each of the tapered nipples 70 seats in one of the frusto-conical shaped surfaces 72 to provide a fluid tight connection between the bank manifold 19 and the fitting 71.

At the end of the bank manifolds 19, remote from the valve-manifold 24, rails 74 are provided. The rails 74 are fixed to a wall of the tank 20 to provide supports for the bank manifolds 19.

As is best seen in FIGURE 8, each of the rails 74, preferably, has side flanges 77 which limit sidewise or transverse movement of the manifolds 19.

Clamps are provided to maintain the bank manifolds 19 in fluid-tight connection with the fittings 71. These clamps are best seen in FIGURES 3 and 8. Each clamp takes the simple form of a bar 75 which overlaps two contiguous bank manifolds 19 and a clamp screw 76. The clamp screw 76 threads into the bar 75 and acts against the wall of the tank 20. Tightening the clamp screw 76 will bias the bar 75 against the two contacted bank manifolds 19 and in turn urge the bank manifolds into abutment with the fittings 71.

The tank 20 is closed at the top by a removable cover 79. In obtaining the advantages of one of the outstanding features of this invention the cover 79 is removed. The clamp screws 76 are released and the filter elements may be removed in banks for repair, cleansing or replacement. In returning or replacing one of the banks, one simply telescopes the tapered fitting 70 into the corresponding tapered seat 72 and places the other end of the bank manifold 19 on one of the rail supports 74. Further, if it is desired to only replace, repair or clean one or two of the bank manifolds, the clamping arrangement allows the release of only two of the banks. As will be seen, the banks are arranged in pairs and each of the simplified clamp bars 75 acts against a pair of the banks. For this reason, an even numbered amount of banks, six, are provided in the embodiment.

An examination of this structure will also show that repair of the elements is greatly simplified to provide another outstanding advantage of the invention. To dismantle one of the banks all that is needed is to disconnect the elongated end clamping bolts 63. The strap 60 is then removed and each of the mesh and screen tubes 65, 66 may be repaired, replaced, or cleaned individually.

Another outstanding advantage of the invention which is provided with this described bank assembly is that the bank manifolds 19 are at the top of the filter chamber 23. When the solvent is filtered to separate fine lint and the like, some fine particles may very well find their way through the filter screen tubes 66. With the outlets from the filter elements into the manifolds being at the top of the vertically positioned filter elements, these fine particles will tend to settle out of the solvent as sediment rather than being carried with the solvent through the outlet as is the case with many prior known assemblies having outlets at the lower part of a filter assembly.

The valve-manifold 24 provides additional outstanding advantages of the invention. One of these is that the valve-manifold is at the top of and external of the tank 20. This provides very convenient simplified replacement or repair of the valve-manifold. Other of these advantages reside in the construction of the valve-manifold.

Referring now to FIGURE 5, the valve-manifold 24 includes a cylindrically contoured tubular housing 80 which is secured to a mounting plate 84. The housing 80 and mounting plate have a plurality of axially aligned inlet apertures 81. Each of the inlet apertures 81 is thread connected to one of the fittings 71. Each inlet aperture 81 is in communication with the passage defined by the fitting 71.

A circular fitting 82 is secured to the outlet end of the housing 80. The fitting 82 has a threaded outlet aperture 83 to which the outlet conduit 25 is connected.

A tubular valve sleeve 85 is tightly telescoped into the tubular housing 80. The valve sleeve 85 has a first set of uniformly spaced and axially aligned inlet apertures 86. When the sleeve is in the operation position shown in each of the drawings, the apertures 86 of the first set are each aligned with one of the housing inlet apertures 81 so that the interior of the sleeve 85 is in fluid communication with all of the bank manifolds 19. Thus, in the operation position, the valve-manifold connects the outlet conduit 25 to all of the bank manifolds 19.

A sleeve plug 87 is fixed to and closes the end of the sleeve 85 remote from the outlet 83. This end is the left-hand end as seen in FIGURE 5. A control shaft 88 is connected to the plug 87. The shaft 88 is surrounded by a suitable packing assembly, shown generally at 89, that forms a fluid seal around the plug and shaft 87, 88 and retains the sleeve within the housing 80. A back flushing control handle 90 is fixed to the outer end of the sleeve control shaft 88. The back flushing control handle 90 includes a pointer 92 to designate the position of the sleeve on a suitably calibrated face plate 93, FIGURES 3 and 5. The handle 90 carries a spring and ball 94, 95. The spring and ball provide a detent to index the handle 90 to each of its selectable positions.

The sleeve 85 includes a second set of through apertures which are designated by the numbers 101–106. The apertures of the second set 101–106 are axially spaced from one another the same distance as the apertures of the first set 86 and the fittings 71. In addition, the apertures 101–106 of this second set are circumferentially spaced from one another. The apertures of the second set are each circumferentially spaced 60° from the contiguous aperture.

When the sleeve control handle 90 is indexed 60°, in a clockwise direction as seen in FIGURE 3, the aperture 106 is brought into registry with the housing inlet aperture 81 nearest the outlet 83. All of the other inlet apertures are closed. Sequentially, as the handle 90 is indexed 60° at a time in a clockwise direction, the apertures of the second set 101–106 are indexed one at a time and in reverse numerical order into alignment with the associated one of the inlet apertures 81. Thus, the aperture 101 will be brought into registry with the inlet 81 at the left end of FIGURE 5 when the handle has been rotated 300° in a clockwise direction.

The advantages of this valve-manifold assembly for reverse flushing will be immediately apparent. All filter banks may be simultaneously back-flushed in the usual manner by leaving the valve assembly in its operation or zero position. During back flushing, however, the handle 90 is rotated in increments of 60° to bring the banks one at a time into communication with the back flush fluid. This directs the entire force of the back flush fluid to the filter elements of a bank one at a time. The obvious advantages and improvements in back flushing abilities will be apparent.

While the invention has been described with a great deal of detail, it will be seen that it includes a novel and improved filter assembly. The assembly has filter elements connected together in banks with each bank removable as a unit for repair cleaning or replacement of the filter elements. The invention also includes bank manifolds positioned at the top of the assembly. Another of the inventive features resides in the novel and improved valve-manifold which includes a mechanism designed to provide an ability to back-flush the banks one at a time. The invention also contemplates the provision of a novel and improved filter element.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the inveniton as hereinafter claimed.

What is claimed is:
1. A dry cleaning filter assembly comprising:
(a) a tank having a plurality of side walls and a bottom defining a chamber, said tank including solvent inlet and reverse flushing outlet openings communicating with the chamber near said bottom;
(b) a main manifold and valve means connected to the tank and having a plurality of inlet openings, said main manifold and valve means having an outlet opening;
(c) an outlet conduit connected to the main manifold and valve means outlet opening;
(d) said tank including a plurality of supporting rails within said chamber and disposed on a side of the chamber opposite from said main manifold inlets;
(e) a plurality of elongated tubular bank manifolds within the chamber and each having an outlet at one end and a plurality of aligned inlet openings along a lower wall thereof, said bank manifolds being otherwise imperforate;
(f) each of said bank manifolds having its outlet removably connected to one of the main manifold inlets, each such removable connection including coacting tapered surfaces telescoped together, each of said bank manifolds being supported at one end by one of said rails;
(g) clamp and biasing means within said tank biasing each bank manifold tapered surface into a fluid tight connection with the coacting tapered surface of said main manifold and valve means;
(h) a plurality of banks of tubular filter elements each filter element connected to and depending from a bank manifold and within the chamber, each of said filter elements including filtering side walls, and each of said filter elements including an end opening connected to one of said bank manifold inlets;
(i) said main valve and manifold means having a sleeve with a set of aligned apertures, said valve and manifold having an operating position in which each of the apertures forms a fluid communication between one of the bank manifolds and the outlet conduit through said connections; and,
(j) said valve and manifold means sleeve also having a second set of staggered back flushing apertures and a plurality of back flushing positions, said valve and manifold means providing fluid communication between at least one but not all of said bank manifolds and said outlet conduit through at least one of said connections when in each of said back flushing positions.

2. The device of claim 1 wherein there are an even number of bank manifolds and each biasing means biases a pair of said bank manifolds.

3. The device of claim 1 wherein said valve and manifold means is external of the tank with inlets thereto extending through the walls of the tank and said bank manifold and filters are within said tank and connected to said inlets.

References Cited in the file of this patent
UNITED STATES PATENTS

| | | |
|---|---|---|
| 401,930 | Cooper et al. | Apr. 23, 1889 |
| 402,738 | Hyatt | May 7, 1889 |
| 1,359,162 | Genter | Nov. 16, 1920 |
| 1,771,928 | Jung | July 29, 1930 |
| 2,819,800 | Goodloe | Jan. 14, 1958 |
| 2,848,112 | Hass | Aug. 19, 1958 |
| 2,859,876 | Brundage | Nov. 11, 1958 |
| 3,037,635 | Boorugy | June 5, 1962 |

FOREIGN PATENTS

| | | |
|---|---|---|
| 782,899 | France | Mar. 25, 1935 |